US 6,868,508 B2

(12) United States Patent
Grey

(10) Patent No.: US 6,868,508 B2
(45) Date of Patent: Mar. 15, 2005

(54) SYSTEM AND METHOD ENABLING HIERARCHICAL EXECUTION OF A TEST EXECUTIVE SUBSEQUENCE

(75) Inventor: James Grey, Cedar Park, TX (US)

(73) Assignee: National Instruments Corporation, Austin, TX (US)

( * ) Notice: Subject to any disclaimer, the term of this patent is extended or adjusted under 35 U.S.C. 154(b) by 555 days.

(21) Appl. No.: 09/943,988

(22) Filed: Aug. 31, 2001

(65) Prior Publication Data

US 2003/0093736 A1 May 15, 2003

(51) Int. Cl.⁷ .................................................. G06F 11/00
(52) U.S. Cl. ......................... 714/25; 714/48; 702/120
(58) Field of Search ................................ 714/1, 26, 25, 714/48; 702/120

(56) References Cited

U.S. PATENT DOCUMENTS

| | | | | |
|---|---|---|---|---|
| 5,195,095 A | * | 3/1993 | Shah | 714/26 |
| 6,128,759 A | | 10/2000 | Hansen | |
| 6,219,829 B1 | * | 4/2001 | Sivakumar et al. | 717/131 |
| 6,397,378 B1 | | 5/2002 | Grey et al. | |
| 6,502,051 B1 | * | 12/2002 | Coyle | 702/123 |
| 6,532,552 B1 | * | 3/2003 | Benignus et al. | 714/25 |
| 2003/0200049 A1 | * | 10/2003 | Sutton | 702/120 |

OTHER PUBLICATIONS

National Instruments, LabVIEW, "Test Executive Reference Manual", Aug. 1997.
Johnson, Laura, "Test and Measurement—Understanding Test Executives," Webpage www.testandmeasurement.com. content/news/ , Oct. 16, 2000, pp. 1–9.

* cited by examiner

*Primary Examiner*—Robert Beausoliel
*Assistant Examiner*—Marc Duncan
(74) *Attorney, Agent, or Firm*—Meyertons Hood Kivlin Kowert & Goetzel, P.C.; Jeffrey C. Hood; Jason L. Burgess

(57) ABSTRACT

Individual test executive sequences may correspond to individual sub-components of a hierarchical system. To test a system sub-component directly without testing "upper" sub-components in the hierarchy, a first test executive sequence corresponding to that system sub-component may be executed directly, without requiring execution of test executive sequences above the first test executive sequence in the hierarchy, or requiring only partial execution of test executive sequences above the first test executive sequence in the hierarchy. Another embodiment of the invention comprises a system and method for enabling propagation or inheritance of test executive sequence local variables.

45 Claims, 9 Drawing Sheets

FIG. 4

SYSTEM AND METHOD ENABLING HIERARCHICAL EXECUTION OF A TEST EXECUTIVE SUBSEQUENCE

FIELD OF THE INVENTION

The present invention relates to the field of test executive software for organizing and executing test executive sequences. In particular, the invention relates to a system and method enabling hierarchical execution of a test executive subsequence.

DESCRIPTION OF THE RELATED ART

Test executive software is specialized software that allows a user to organize and execute sequences of reusable test modules to test units under test (UUTs). For example, the test modules may interact with one or more hardware instruments to test the UUT(s). The test modules often have a standard interface and typically can be created in a variety of programming environments. The test executive software operates as a control center for the automated test system. More specifically, the test executive software allows the user to create, configure, and/or control test sequence execution for various test applications, such as production and manufacturing test applications. Text executive software typically includes various features, such as test sequencing based on pass/fail results, logging of test results, and report generation, among others.

Test executives include various general concepts. The following comprises a glossary of test executive nomenclature, as used herein:

Code Module—A program module, such as a Windows Dynamic Link Library (.dll), LabVIEW VI (.vi), ActiveX component, or other type of program module or component, that implements one or more functions that perform a specific test or other action.

Test Module—A code module that performs a test of a UUT.

Step—An action that the user can include within a sequence of other actions. A step may call a test module to perform a specific test.

Step Module—The code module that a step calls.

Sequence—A series of steps that the user specifies for execution in a particular order. Whether and when a step is executed can depend on the results of previous steps.

Sequence File—A file that contains the definition of one or more sequences.

Sequence Editor—A program that provides a graphical user interface for creating, editing, and debugging sequences.

Run-time Operator Interface—A program that provides a graphical user interface for executing sequences on a production station. A sequence editor and run-time operator interface can be separate application programs or different aspects of the same program.

Test Executive Engine—A module or set of modules that provide an API for creating, editing, executing, and debugging sequences. A sequence editor or run-time execution operator interface uses the services of a test executive engine.

Application Development Environment (ADE)—A programming environment such as LabVIEW, LabWindows/CVI, Microsoft Visual C++, Microsoft Visual Basic, etc., in which the user can create test modules and run-time operator interfaces.

Unit Under Test (UUT)—The device or component that is being tested.

Thus, the user may use the sequence editor to construct a test executive sequence comprising a plurality of steps. The test executive sequence may then be executed to perform tests of a system or UUT. In many cases, the system under test can be logically or physically divided into sub-components that can be tested in a hierarchical manner. For example, consider a computer system having a chassis with several expansion slots and expansion boards attached to the expansion slots. Each expansion board may in turn have various elements, such as I/O channels, etc. In this example, the system as a whole may be viewed as a hierarchy of sub-components, e.g., the expansion slots, the various boards connected to the slots, I/O channels and other elements on the expansion slots, etc.

In a system comprising a hierarchy of sub-components such as described above, test developers often desire to organize test software in such a way as to mimic the system hierarchy. For example, one technique for achieving this is to create a hierarchy of test executive sequences, where each sequence maps to a sub-component of the system. Thus, in the example above, a first test executive sequence may be responsible for testing an expansion slot, e.g., physical connections for the slot. During execution of the first test executive sequence, the first test executive sequence may call a second test executive sequence to test an expansion board connected to the slot. This second test executive sequence may in turn call one or more additional test executive sequences to test the various sub-components of the expansion board.

One problem that test developers have faced in the past is how to test only a portion of a hierarchical system. For example, it may take hours or days to entirely test a very complex system. Thus, it would be very desirable to provide an ability to test or re-test only the sub-component(s) of interest. However, in the prior art, the user cannot simply select a test executive sequence corresponding to the sub-component of interest and request to execute that particular sequence. This is due in part to interactions among the test executive sequences. For example, when a first test executive sequence calls a second test executive sequence, the second test executive sequence often uses data that is set by the first test executive sequence. Therefore, without the first test executive sequence executing first to set this data correctly, the second test executive sequence may not execute correctly. Thus, it would be desirable to provide a test executive system that overcomes this problem.

SUMMARY OF THE INVENTION

One embodiment of the present invention comprises a system and method enabling a first test executive sequence within a test executive sequence hierarchy to be specified, wherein execution is desired to begin at the first test executive sequence, such that the first test executive sequence executes correctly, wherein it is not necessary to execute the sequences above the first test executive sequence in the hierarchy.

According to one embodiment of the method, a plurality of test executive sequences may first be created in response to user input. For example, the user may utilize a sequence editor that provides a graphical user interface for creating the test executive sequences. In one embodiment, the sequence editor may enable the user to specify a hierarchy among the test executive sequences, e.g., wherein the hierarchy of test executive sequences is operable to test a hierarchical system such as described above. For example, each test executive sequence may map to a sub-component of the system and may be operable to test the respective sub-component. In one embodiment, the sequences may be displayed graphically in a hierarchical manner, such as in a tree view.

In one method of operation, the hierarchy of test executive sequences may be executed according to the entire hierarchy, wherein a top-level sequence in the hierarchy is executed first, followed by child sequences, etc.

The method may also enable a test executive sequence from the plurality of test executive sequences to be "hierarchically called", such that the test executive sequence is called directly, independent of its location within the hierarchy. As used herein, the term "hierarchically calling" a test executive sequence means that the test executive sequence is called directly, wherein the test executive sequence may be a child sequence of another sequence in the hierarchy, such that execution begins at the called sequence. If the hierarchically called sequence has one or more child sequences in the hierarchy, then execution may then proceed to these child sequences. In one embodiment, test executive sequences that are above the hierarchically called sequence in the hierarchy are not executed at all. In another embodiment, these test executive sequences may be executed only partially, as described below.

For example, a first test executive sequence may be hierarchically called, wherein the first test executive sequence is operable to test a first system sub-component of a first level in the system hierarchy, wherein the first level is not the top level of the system hierarchy. In response, the first test executive sequence may be executed. In one embodiment, execution of the first test executive sequence may be performed without executing test executive sequences that map to system sub-components above the first system sub-component in the hierarchy.

In one embodiment, the hierarchy of test executive sequences may comprise a chain of test executive sequences, wherein the chain of test executive sequences includes one top-level test executive sequence and one or more non-top-level (lower level) test executive sequences. To test a system sub-component directly without testing "upper" sub-components in the hierarchy, a first test executive sequence corresponding to that system sub-component may be executed directly, without requiring execution of the test executive sequences that come before the first test executive sequence in the chain.

As noted above, in one embodiment, in addition to execution of a hierarchically called first test executive sequence, a partial execution of one or more test executive sequences above the first test executive sequence in the hierarchy may be performed. The partial execution of these sequences may be performed, for example, to initialize data values used by the first test executive sequence and/or to properly initialize the system to enable testing of the desired sub-component.

In various embodiments, such partial execution may be performed in any of various ways, e.g., depending on the details of how the test executive software structures or organizes test executive sequences. For example, in one embodiment, test executive sequences may be organized in step groups. For example, a test executive sequence may comprise a setup group of steps, a main group of steps, a cleanup group of steps, etc. In this case, partial execution of the test executive sequences may comprise executing steps of the setup group, but not steps from the main group.

In one embodiment, a user may specify the first test executive sequence by interacting with a graphical user interface of the test executive software. For example, as described above, the hierarchy of test executive sequences may be graphically displayed, e.g., as a set of sequences organized in a hierarchy, such as in a tree view of the sequences. In this case, the user may select the desired first test executive sequence from the list, e.g., by clicking on the first test executive sequence with a mouse, and may then request to begin execution starting with the selected first test executive sequence, e.g., by utilizing a menu option to request this. In response, the first test executive sequence may be hierarchically executed as described above.

In another embodiment, the hierarchical execution of the first test executive sequence may be programmatically specified. For example, the test executive software may provide an application programming interface (API) including a function or method for requesting the hierarchical execution. One embodiment of a NewHierarchicalExecution method is described. In this embodiment, the NewHierarchicalExecution method has a sequenceCallSteps parameter, which is an array of sequence call steps. The array represents a call stack to recreate while only executing steps in setup groups from the sequences on the stack.

Variable Propagation (Inheritance)

In one embodiment, the test executive sequences may utilize local variables to store data relevant to the execution of the sequence. An API may be used to access local variables from code modules that steps call in the sequence. Also, local variables may be passed by value or by reference to any step in the sequence that calls a subsequence.

A method for enabling propagation or inheritance of test executive sequence local variables is described. Sequence local variables may have a Boolean option, referred to as "Propagate to Subsequence". The default value of the option may be False. For example, the option may appear as a checkable menu item in a context menu for a local variable. The option may also be accessible as a PropertyObject flag in an API of the test executive software.

If the user enables the Propagate to Subsequence option for a sequence local variable, the variable also exists at run-time as a local variable in subsequences that the sequence calls. The variable may continue to propagate as the call chain extends. Sequence local variables may have a second Boolean option, referred to as "Permit Propagation from Caller". The default value of this option may be False. The Permit Propagation from Caller option may also appear as a checkable menu item in the local variable context menu and may also be accessible as a PropertyObject flag in an API of the test executive software.

The test executive may use the Permit Propagation from Caller option to determine which variable takes precedence when a subsequence defines a variable with the same name as a variable that the calling sequence propagates. If Permit Propagation from Caller is False, the test executive may preserve the subsequence local variable. If Permit Propagation from Caller is True, the test executive may replace the subsequence variable with the variable the caller propagates.

The user may set the Permit Propagation from Caller option to True to specify that a propagated variable will override the sequence variable. The user may set the Permit Propagation from Caller option to False to specify that the propagated variable does not replace the sequence variable. The user may use the False setting to achieve a traditional nested scoping of variables. In one embodiment, the sequence editor may show variables that a sequence inherits at run-time.

When a propagated variable overrides an existing sequence variable, the test executive may generate an error if the data types of the variables do not match.

In one embodiment, the above-described method for enabling propagation or inheritance of test executive sequence local variables may be utilized in implementing the ability to hierarchically call a test executive sequence. For example, where partial execution occurs of higher-level sequences above a hierarchically-called first sequence, variables set by the higher-level sequences (e.g., variables set by steps in setup groups of the higher-level sequences) may be propagated to the hierarchically-called first sequence to enable the first sequence to execute correctly.

BRIEF DESCRIPTION OF THE DRAWINGS

A better understanding of the present invention can be obtained when the following detailed description of the preferred embodiment is considered in conjunction with the following drawings, in which:

FIG. 4 illustrates one example of a test executive sequence, created according to one embodiment of a test executive application;

Figure 1:
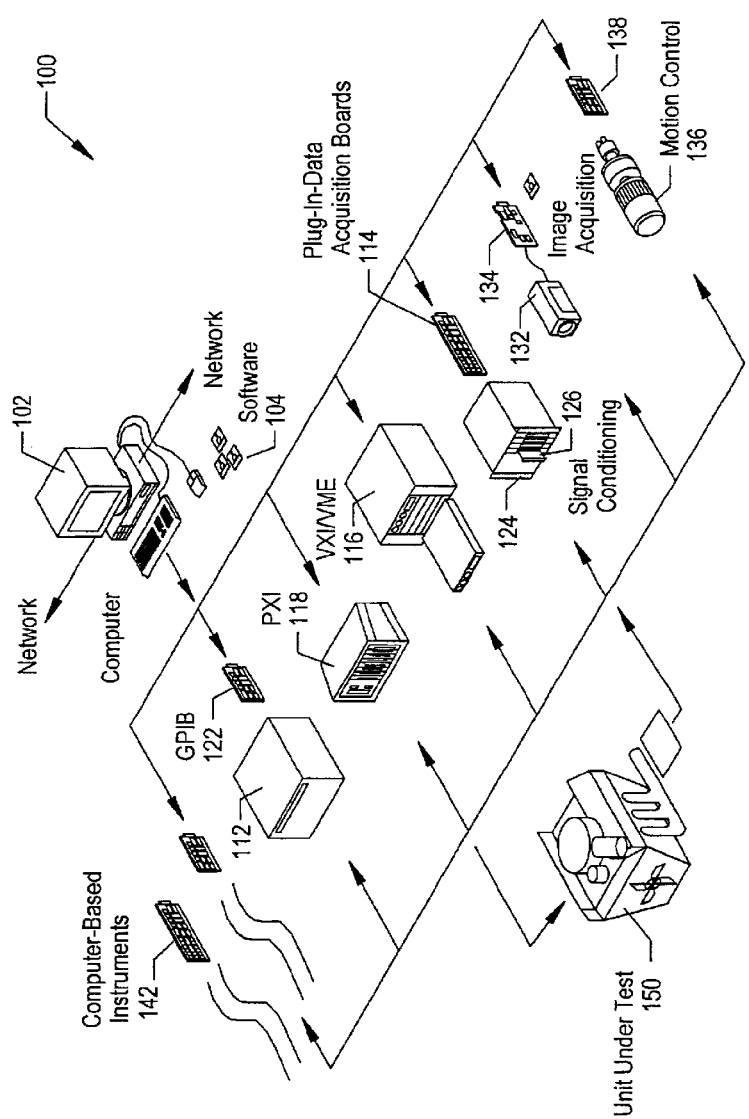
FIG. 1 illustrates an instrumentation control system according to one embodiment of the present invention.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Incorporation by Reference

The following references are hereby incorporated by reference in their entirety as though fully and completely set forth herein.

U.S. patent application Ser. No. 09/259,162 titled "Test Executive System and Method Including Step Types for Improved Configurability," filed Feb. 26, 1999.

U.S. patent application Ser. No. 09/944,546 titled "System and Method Enabling Execution Stop and Restart of a Test Executive Sequence(s)," filed Aug. 31, 2001.

FIG. 1—Instrumentation System

FIG. 1 illustrates an exemplary instrumentation control system 100. The system 100 comprises a host computer 102 that connects to one or more instruments. The host computer 102 comprises a CPU, a display screen, memory, and one or more input devices such as a mouse or keyboard as shown. The computer 102 may connect through the one or more instruments to analyze, measure or control a unit under test (UUT) or process 150. In one embodiment, the UUT may comprise a system comprising a plurality of sub-components organized in a hierarchical manner. The computer 102 may utilize a test executive application for performing automated tests of the system or tests of portions of the system, as described below. It is noted that FIG. 1 is exemplary only, and the present invention may be used in conjunction with any of various systems, as desired.

The one or more instruments may include a GPIB instrument 112 and associated GPIB interface card 122, a data acquisition board 114 and associated signal conditioning circuitry 124, a VXI instrument 116, a PXI instrument 118, a video device 132 and associated image acquisition card 134, a motion control device 136 and associated motion control interface card 138, and/or one or more computer based instrument cards 142, among other types of devices.

The GPIB instrument 112 may be coupled to the computer 102 via a GPIB interface card 122 provided by the computer 102. In a similar manner, the video device 132 may be coupled to the computer 102 via the image acquisition card 134, and the motion control device 136 may be coupled to the computer 102 through the motion control interface card 138. The data acquisition board 114 may be coupled to the computer 102, and optionally interfaces through signal conditioning circuitry 124 to the UUT. The signal conditioning circuitry 124 preferably comprises an SCXI (Signal Conditioning EXtensions for Instrumentation) chassis comprising one or more SCXI modules 126.

The GPIB card 122, the image acquisition card 134, the motion control interface card 138, and the DAQ card 114 are typically plugged in to an I/O slot in the computer 102, such as a PCI bus slot, a PC Card slot, or an ISA, EISA or MicroChannel bus slot provided by the computer 102. However, these cards 122, 134, 138 and 114 are shown external to computer 102 for illustrative purposes. The cards 122, 134, 138 and 114 may also be implemented as external devices coupled to the computer 102, such as through a serial bus.

The VXI chassis or instrument 116 may be coupled to the computer 102 via a serial bus, MXI bus, or other serial or parallel bus provided by the computer 102. The computer 102 preferably includes VXI interface logic, such as a VXI, MXI or GPIB interface card (not shown), which interfaces to the VXI chassis 116. The PXI chassis or instrument is preferably coupled to the computer 102 through the computer's PCI bus.

A serial instrument (not shown) may also be coupled to the computer 102 through a serial port, such as an RS-232 port, USB (Universal Serial bus) or IEEE 1394 or 1394.2 bus, provided by the computer 102. In typical systems an instrument will not be present of each interface type, and in fact many systems may only have one or more instruments of a single interface type, such as only GPIB instruments.

The instruments are coupled to the unit under test (UUT) or process 150, or are coupled to receive field signals, typically generated by transducers. Other types of instruments or devices may be connected to the system, as desired.

The computer system 102 preferably includes a memory medium on which test executive software according to one embodiment of the present invention is stored. The test executive software may allow a user to create, configure, and/or control test executive sequence execution for various test applications, such as production and manufacturing test applications. As described in detail below, the test executive software may include functionality for hierarchical execution of a test executive sequence. Also as described below, the test executive software may also include functionality for enabling propagation or inheritance of test executive sequence local variables.

The term "memory medium" is intended to include an installation medium, e.g., a CD-ROM, floppy disks 104, or tape device; a computer system memory or random access memory such as DRAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer that connects to the first computer over a network, such as the Internet. In the latter instance, the second computer may provide program instructions to the first computer for execution. The host computer CPU executing code and data from the memory medium may comprise a means for implementing the methods described below.

Figure 2:
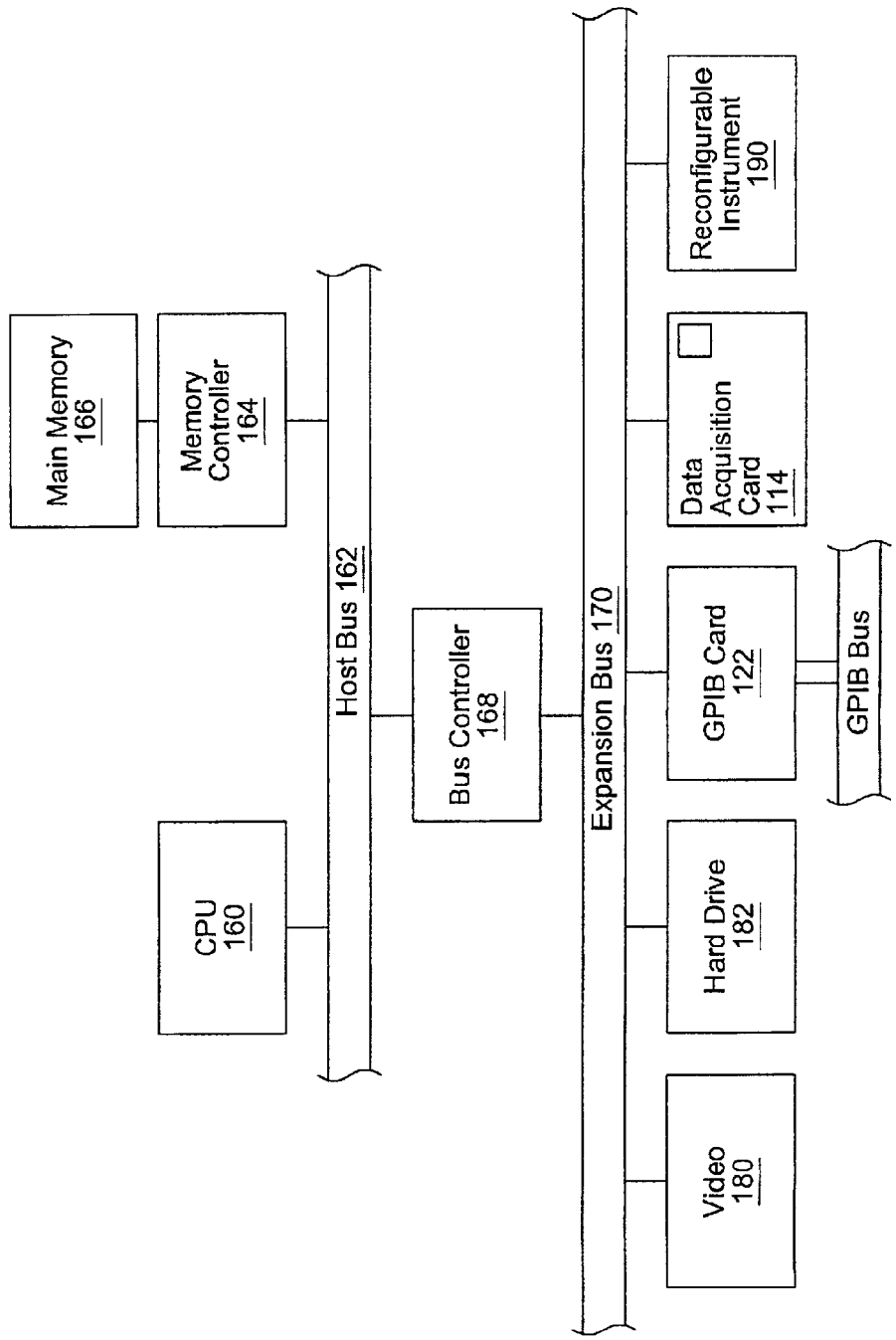
FIG. 2 is a block diagram of the computer system of FIG. 1.

FIG. 2—Computer System Block Diagram

FIG. 2 is a block diagram of the computer system illustrated in FIG. 1. It is noted that any type of computer system configuration or architecture can be used as desired, and FIG. 2 illustrates a representative PC embodiment. It is also noted that the computer system may be a general purpose computer system as shown in FIG. 1, a computer implemented on a VXI card installed in a VXI chassis, a computer implemented on a PXI card installed in a PXI chassis, or other types of embodiments. Elements of a computer not necessary to understand the present invention have been omitted for simplicity.

The computer 102 includes at least one central processing unit or CPU 160 that is coupled to a processor or host bus 162. The CPU 160 may be any of various types, including an ×86 processor, e.g., a Pentium class, a PowerPC processor, a CPU from the SPARC family of RISC processors, as well as others. Main memory 166 is coupled to the host bus 162 by means of memory controller 164.

The main memory 166 may store software according to one embodiment of the present invention, such as test executive software with functionality as described above with reference to FIG. 1. The main memory 166 may also store operating system software as well as other software for operation of the computer system, as well known to those skilled in the art.

The host bus 162 is coupled to an expansion or input/output bus 170 by means of a bus controller 168 or bus bridge logic. The expansion bus 170 is preferably the PCI (Peripheral Component Interconnect) expansion bus, although other bus types can be used. The expansion bus 170 includes slots for various devices such as the data acquisition board 114 (of FIG. 1) and a GPIB interface card 122 that provides a GPIB bus interface to the GPIB instrument 112 (of FIG. 1). The computer 102 further comprises a video display subsystem 180 and hard drive 182 coupled to the expansion bus 170.

As shown, a reconfigurable instrument 190 may also be connected to the computer 102. The reconfigurable instrument 190 may include a functional unit, also referred to as configurable logic, such as a programmable logic device (PLD), e.g., an FPGA, or a processor and memory, which may execute a real time operating system. Program instructions may be downloaded and executed on the reconfigurable instrument 190. In one embodiment, at least a portion of the test executive software described herein may execute on the reconfigurable instrument 190. In various embodiments, the functional unit may be comprised on an instrument or device connected to the computer through means other than an expansion slot, e.g., the instrument or device may be connected via an IEEE 1394 bus, USB, or other type of port. Also, the functional unit may be comprised on a device such as the data acquisition board 114 or another device shown in FIG. 1.

Test Executive Software Components

Figure 3:
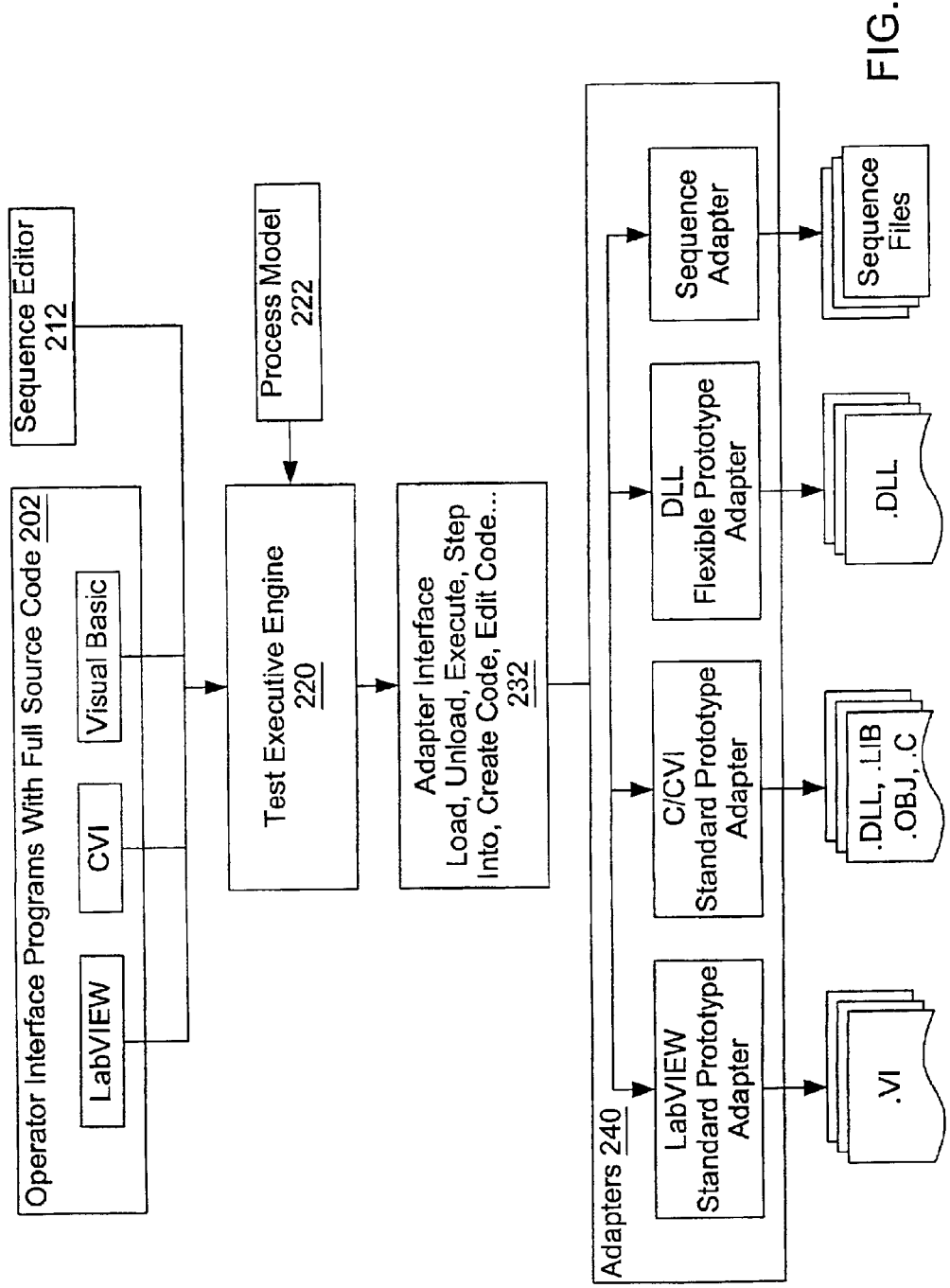
FIG. 3 illustrates a test executive application software architecture according to one embodiment of the present invention.

FIG. 3 is a block diagram illustrating high-level architectural relationships between elements of one embodiment of a test executive software application. It is noted that FIG. 3 is exemplary, and the present invention may be utilized in conjunction with any of various test executive software applications or architectures. In one embodiment, the elements of FIG. 3 are comprised in the TestStand test executive product from National Instruments. As shown, the test executive software of FIG. 3 includes operator interface programs 202 for interfacing to various software programs. The operator interface programs 202 shown in FIG. 3 are for creating operator interface programs using the LabVIEW, LabWindows/CVI, and Visual Basic application development environments. However, additional operator interface programs 202 may be included for development with other application development environments.

The test executive software of FIG. 3 also includes a sequence editor 212 for creating and editing test executive sequences. The sequence editor 212 and the operator interface programs 202 interface to the test executive engine 220. One or more process models 222 couple to the test executive engine 220. The test executive engine 220 interfaces through an adapter interface 232 to one or more adapters 240. The adapters shown in FIG. 3 include the LabVIEW standard prototype adapter, the C/CVI prototype adapter, the DLL flexible prototype adapter, and the sequence adapter. The LabVIEW standard prototype adapter interfaces to program modules having a .VI extension, i.e., LabVIEW graphical programs. The C/CVI prototype adapter interfaces to program modules having a .dll, .lib, .obj, or .c extension. The DLL flexible prototype adapter interfaces to program modules having a .dll extension. The sequence adapter interfaces to sequence files.

The test executive engine 220 manages the execution of test executive sequences. Sequences comprise steps that may call external code modules. By using module adapters 240 that have the standard adapter interface 232, the test executive engine 220 can load and execute different types of code modules. Thus, the test executive may be independent from particular application development environments (ADEs) used to create the code modules. In one embodiment, the test executive may use a special type of sequence called a process model to direct the high-level sequence flow. The test executive engine 220 may implement an API used by the sequence editor 212 and run-time operator interfaces 202.

Test Executive Sequence Editor

The sequence editor 212 may be an application program in which the user creates, modifies, and/or debugs test executive sequences. The sequence editor 212 may have a graphical user interface (GUI) enabling a user to efficiently create a test executive sequence for testing a system or unit under test. For example, the sequence editor 212 may provide the user with easy access to test executive features, such as step types, step properties, sequence parameters, step result collection, etc.

Figure 4:
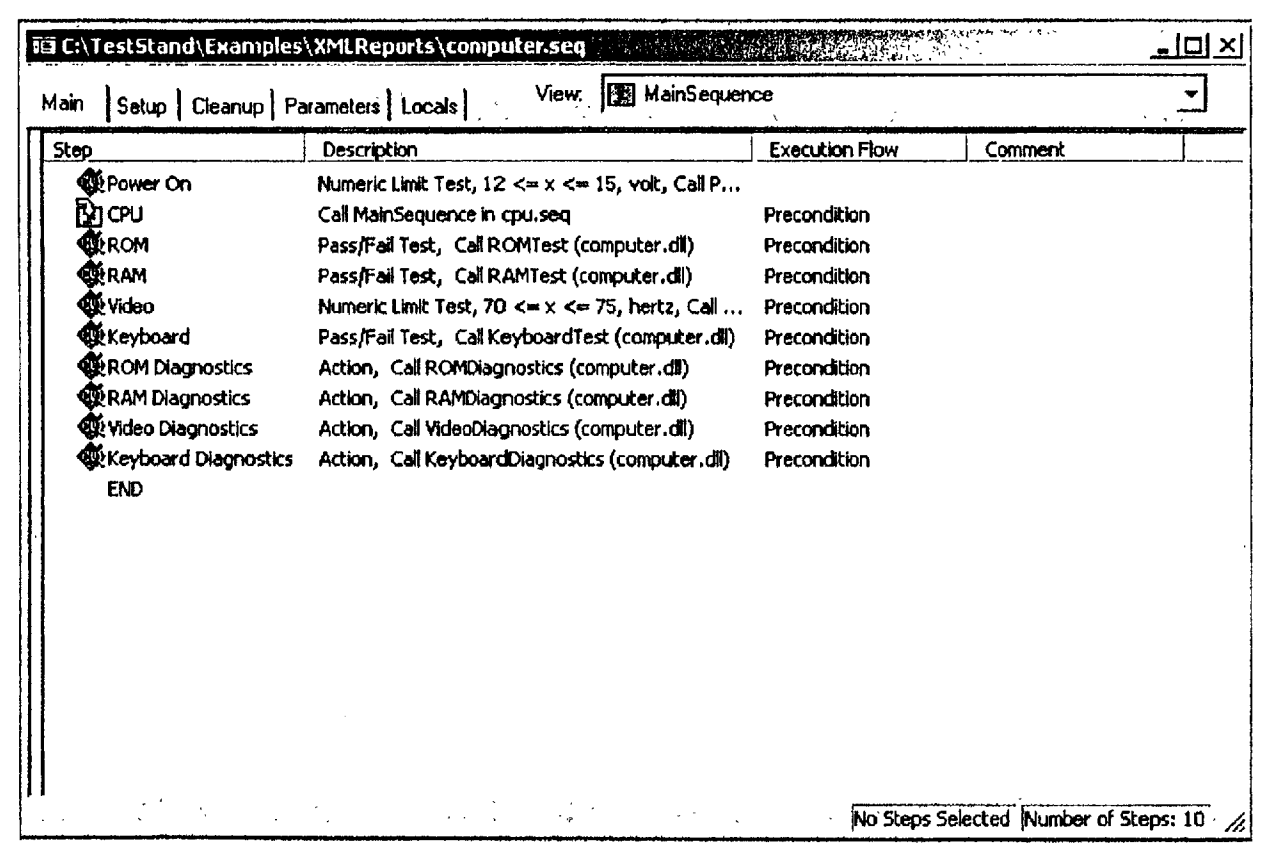
Figure 5:
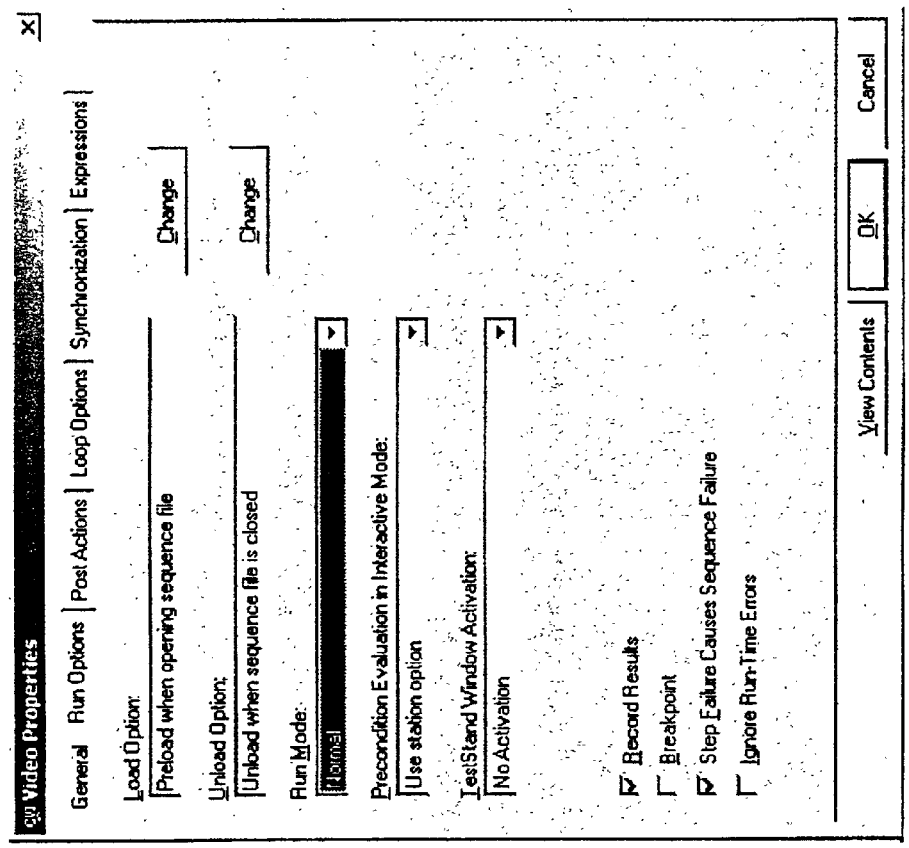
FIG. 5 illustrates an exemplary dialog box for a test executive step, which enables the user to specify various properties for the step that affect the way the test executive software manages the execution of the step.

FIG. 4 illustrates one example of a test executive sequence, created according to one embodiment of a sequence editor 212. The exemplary sequence of FIG. 4 comprises a plurality of test executive steps operable to test various aspects of a computer system. For example, the sequence includes a "ROM" step to test the computer's read-only memory, a "RAM" step to test the computer's random access memory, etc. Each step may call an external code module that interacts with the computer system to perform the desired test. The user may also specify various properties for each step that affect the way the test executive software manages the execution of the step. For example, FIG. 5 illustrates an exemplary dialog box for the "Video" step. As shown, a "Run Options" property page is selected in FIG. 5. The "Run Options" property page enables the user to specify various options for the step, such as whether to record test results for the step, whether to break execution when the step is reached, whether to pre-load the step when opening the sequence file, etc.

In many cases, test executive sequences may be created to test a system that includes a plurality of sub-components. Often, the system sub-components may be conceptualized as a hierarchy of sub-components, e.g., as in the example given above with sub-components of expansion slots, expansion boards, elements on the expansion boards, etc. To test such a system, a user may utilize the sequence editor 212 to create a plurality of test executive sequences. Each test executive sequence may map to a sub-component of the system. (In some cases, only a portion of the system under test may be conceptualized as a hierarchical system; in this case the plurality of test executive sequences may map to the plurality of sub-components in this portion of the system.) Thus, in one embodiment, the plurality of test executive sequences may also be seen as a hierarchy analogous to the hierarchy of the system. It is noted, however, that in some embodiments there may not be an exact mapping of test executive sequences to system sub-components. For example, some of the test executive sequences may be operable to perform tests that do not specifically test a system sub-component. These test executive sequences may not have a corresponding system sub-component. However, the hierarchy of test executive sequences may still mimic the system hierarchy, at least loosely.

In one embodiment, the hierarchy of test executive sequences may be structured in a tree form, wherein each child test executive sequence in the tree is called by a parent test executive sequence. For example, when a test executive sequence at the root of the tree is executed, this root test executive sequence may call its child test executive sequences, which then call their child test executive sequences, etc. The tree may be traversed to execute the test executive sequences. It is noted that in other embodiments, the plurality of test executive sequences may be structured using any of various other hierarchical techniques, instead of as a tree structure.

Figure 6:
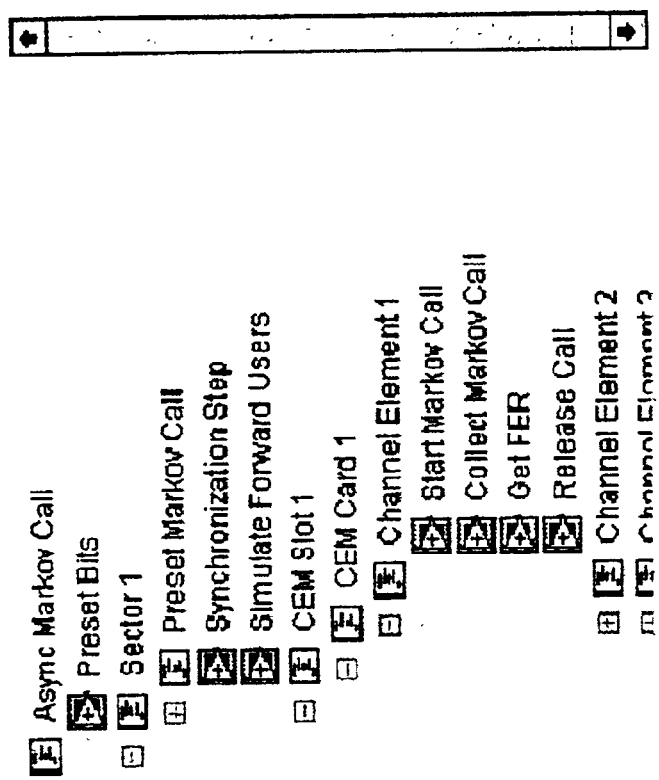
FIG. 6 illustrates a GUI display of a tree of test executive sequences.

In one embodiment, the sequence editor 212 may enable users to structure and display the plurality of test executive sequences hierarchically in a GUI of the sequence editor. For example, FIG. 6 illustrates a GUI display of a tree of test executive sequences. In this example, the root test executive sequence is named "Async Markov Call". As illustrated, sequences named "Preset Bits" and "Sector 1" are located one level below the root test executive sequence. The "Sector 1" sequence has child sequences named "Prset Markov Call", "Synchronization Step", "Simulate Forward Users", and "CEM slot 1", etc.

In other embodiments, the plurality of test executive sequences may execute in a hierarchical manner, but the sequence editor 212 may not necessarily provide the ability to display the sequences hierarchically. As an example, a hierarchy or chain of three test executive sequences, sequence A, sequence B, and sequence C may be created, wherein sequence A calls sequence B, and sequence B calls sequence C. In this example, each of these three sequences may be created independently, and the sequence editor 212 may not provide the ability to visually indicate the sequence hierarchy.

In one embodiment, the sequence editor 212 may also include an execution window that provides debugging tools, such as those found in application development environments such as LabVIEW, LabWindows/CVI, Microsoft Visual C/C++, Microsoft Visual Basic, etc. These may include features such as breakpoints, single stepping, tracing, a variable display, and a watch window.

In one embodiment, in the sequence editor 212, the user may start multiple concurrent executions. Multiple instances of the same sequence can be executed, and different sequences can be executed at the same time, e.g., as separate threads in a multi-threaded system. Each execution instance has its own execution window. In trace mode, the execution window may display the steps in the currently executing sequence. When execution is suspended, the execution window may display the next step to execute and provide single-stepping options. As described below, the user may utilize the sequence editor 212 to interactively create a test executive sequence that asynchronously calls another test executive sequence.

Test Executive Engine

The test executive engine 220 may be used when creating, editing, executing, and debugging test executive sequences. The test executive engine 220 may also provide a test executive engine application programming interface (API) that enables another program to interface with the test executive engine 220 in order to perform these actions. In one embodiment, the test executive engine 220 may export an object-based or component-based API, which in one embodiment may be an ActiveX Automation API. The sequence editor 212 and run-time operator interfaces 202 may use the test executive engine API. The engine API may be called from any programming environment able to use the API. For example, where the API comprises an ActiveX Automation API, the engine API may be called from any programming environment that supports access to ActiveX Automation servers. Thus, in various embodiments, the engine API may be called from test modules written in various programming environments, including test modules that are written in LabVIEW, LabWindows/CVI, Microsoft Visual C++, Microsoft Visual Basic, Java, etc.

One task performed by the test executive engine 220 is to manage the execution of test executive sequences. Executing a sequence may comprise executing steps included in the sequence. Not all steps in the sequence are necessarily executed. For example, the user may configure some steps to be skipped, e.g., depending on execution results of previous steps. For a step that references a user-supplied code module, executing the step may comprise executing the respective code module. In addition to these user-supplied code modules being executed, for each step, additional program instructions may be executed, wherein these additional program instructions implement additional functionality specified for the step. These additional program instructions may be specified by the test executive software, rather than being defined by the respective user-supplied code module for the step. As one example, when including a step in a sequence, the user may configure execution results of the step to be collected. In this example, when the step is executed, program instructions to store the step results accordingly may be executed in addition to the program instructions of a user-supplied code module that the step references. It is noted that not all steps may reference a user-supplied code module. For example, the test executive may provide some step types that primarily affect various aspects of sequence execution and are not designed to reference user-supplied code modules.

Figure 7:
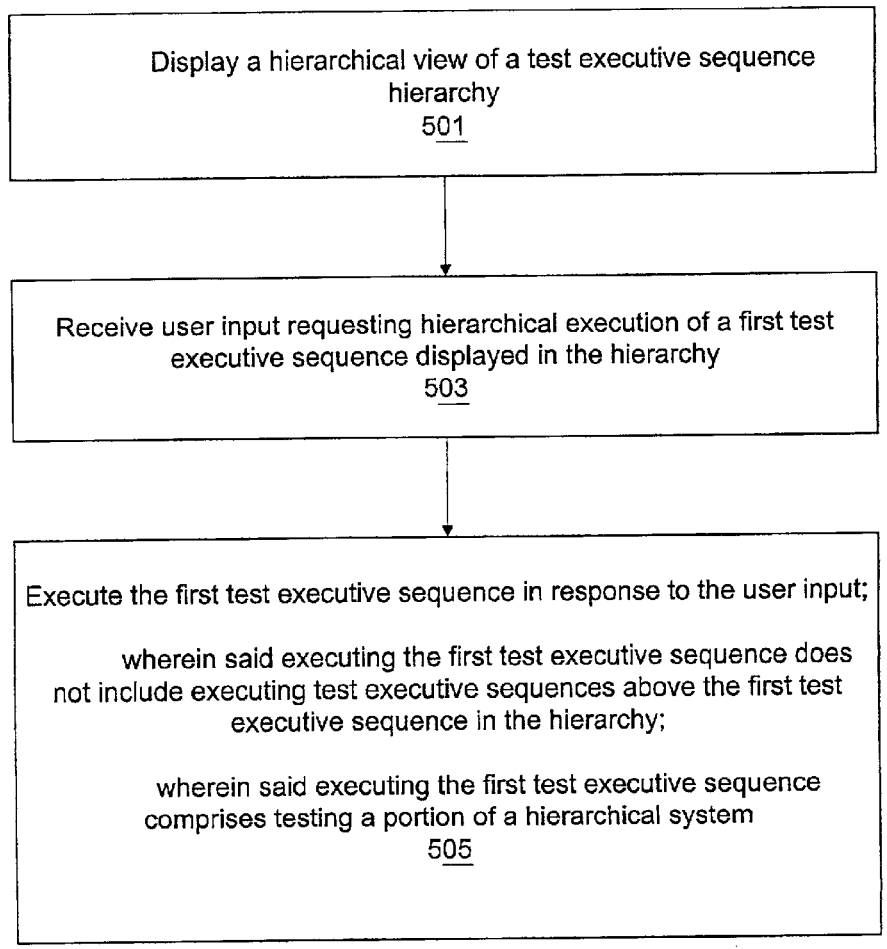
FIG. 7 is a flowchart diagram illustrating one embodiment of a method for hierarchically calling a test executive sequence, such that the test executive sequence is called directly, independent of its location within a test executive sequence hierarchy.

FIG. 7—Directly Calling a Test Executive Sequence within a Hierarchy

FIG. 7 is a flowchart diagram illustrating one embodiment of a method for hierarchically calling a test executive sequence, such that the test executive sequence is called directly, independent of its location within a test executive sequence hierarchy. As used herein, the term "hierarchically calling" a test executive sequence means that the test executive sequence is called directly, wherein the test executive sequence may be a child sequence of another sequence in the hierarchy, such that execution begins at the called sequence. If the hierarchically called sequence has one or more child sequences in the hierarchy, then execution may then proceed to these child sequences. In one embodiment, test executive sequences that are above the hierarchically called sequence in the hierarchy are not executed at all. In another embodiment, these test executive sequences may be executed only partially.

In step 501, a hierarchical view of a test executive sequence hierarchy may be displayed on a display of a computer system, as described above. For example, FIG. 6 illustrates one example of a GUI display of a tree of test executive sequences.

In step 503, user input requesting hierarchical execution of a first test executive sequence displayed in the hierarchy may be received. This may involve the user selecting one of the displayed test executive sequences and requesting hierarchical execution of the selected sequence. For example, in the FIG. 6 illustration, the user may click on the "CEM Slot 1" test executive sequence with a mouse device and then utilize a context menu item to request hierarchical execution of the "CEM Slot 1" test executive sequence.

In step 505, the specified first test executive sequence may be hierarchically executed in response to the user input. This may involve executing the first test executive sequence without executing test executive sequences above the first test executive sequence in the hierarchy. For example, if hierarchical execution of the "CEM Slot 1" test executive sequence is requested as described above, then execution of the "Async Markov Call" test executive sequence (and its child sequences) and execution of the "Sector 1" test executive sequence (and its child sequences other than the "CEM Slot 1" sequence) may not be performed. In another embodiment, only a partial execution of these higher-level sequences may be performed.

However, hierarchical execution of the "CEM Slot 1" sequence preferably does comprise executing child sequences of the "CEM Slot 1" sequence, i.e., the "Channel Element 1" sequence (and its child sequences), the "Channel Element 2" sequence (and its child sequences), etc. In other words, execution effectively begins at the first test executive sequence and continues from that point. Thus, hierarchical execution of the first test executive sequence may result in testing only a portion of a system under test, i.e., that portion which the first test executive sequence (and its child sequences) are operable to test.

As noted above, in one embodiment, in addition to execution of the hierarchically called first test executive sequence, a partial execution of one or more test executive sequences above the first test executive sequence in the hierarchy may be performed. The partial execution of these sequences may be performed, for example, to initialize data values used by the first test executive sequence and/or to properly initialize the system to enable testing of the desired sub-component.

In various embodiments, such partial execution may be performed in any of various ways, e.g., depending on the details of how the test executive software structures or organizes test executive sequences. For example, in one embodiment, test executive sequences may be organized in step groups. For example, a test executive sequence may comprise a setup group of steps, a main group of steps, a cleanup group of steps, etc. In this case, partial execution of the test executive sequences may comprise executing steps of the setup group, but not steps from the main group.

In the above description, a test executive sequence hierarchy is displayed, and the user interactively selects a desires test executive sequence from the hierarchy for which hierarchical execution is desired. In another embodiment, hierarchical execution of a test executive sequence may be programmatically requested. For example, as described above, the test executive software may provide an application programming interface (API). This API may include a function or method for requesting the hierarchical execution of a test executive sequence. One embodiment of a "NewHierarchicalExecution" method is described below. In this embodiment, the NewHierarchicalExecution method has a "sequenceCallSteps" parameter, which is an array of sequence call steps. The array represents a call stack to recreate while only executing steps in setup groups from the sequences on the stack.

Figure 8:
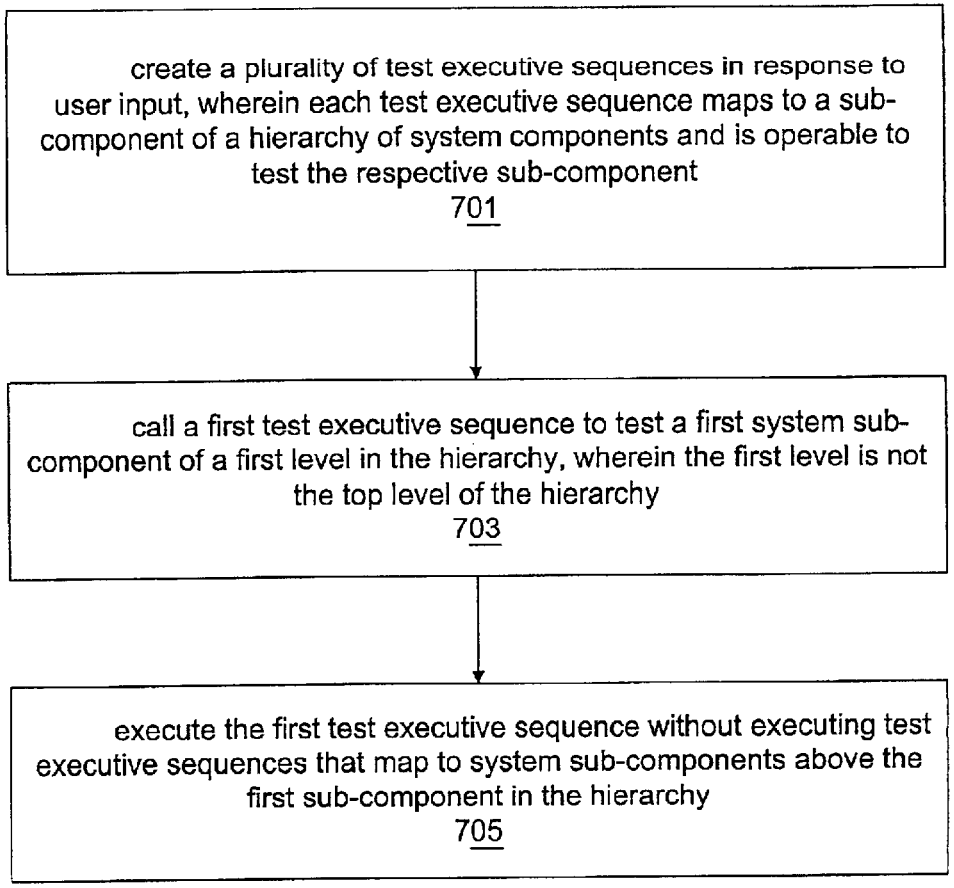
FIG. 8 is a flowchart diagram illustrating one embodiment of a method for testing a sub-component of a hierarchical system.

FIG. 8—Testing a Sub-Component of a Hierarchical System

FIG. 8 is a flowchart diagram illustrating one embodiment of a method for testing a sub-component of a hierarchical system.

In step 701, a plurality of test executive sequences may be created in response to user input, wherein each test executive sequence maps to a sub-component of a hierarchy of system components and is operable to test the respective sub-component.

In step 703, a first test executive sequence may be called to test a first system sub-component of a first level in the hierarchy, wherein the first level is not the top level of the hierarchy.

In step 705, the first test executive sequence may be executed without executing test executive sequences that map to system sub-components above the first sub-component in the hierarchy.

It is noted that in one embodiment the hierarchy of test executive sequences may not necessarily be used to test a hierarchical system. A hierarchy of test executive sequences may be created to test any of various types of units under test systems. The methods described herein may still extend to such systems. In other words, a first test executive sequence may still be directly called and executed without executing (or only partially executing) sequences above the first sequence in the hierarchy.

Figure 9:
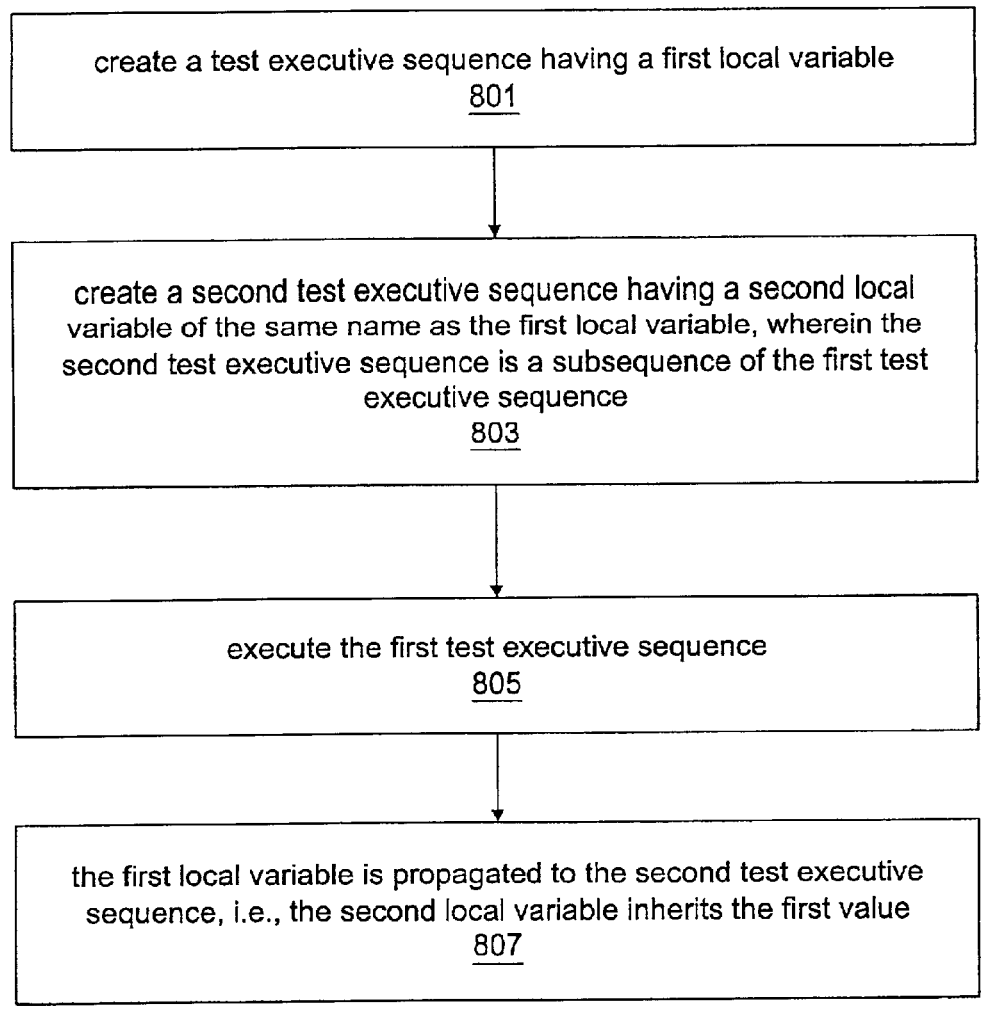
FIG. 9 is a flowchart diagram illustrating one embodiment of a method for enabling propagation or inheritance of test executive sequence local variables.

FIG. 9—Sequence Local Variable Propagation

In one embodiment, test executive sequences may utilize local variables to store data relevant to the execution of the sequences. FIG. 9 is a flowchart diagram illustrating one embodiment of a method for enabling propagation or inheritance of test executive sequence local variables.

In step 801, a first test executive sequence having a first local variable may be created.

In step 803, a second test executive sequence having a second local variable of the same name as the first local variable may be created, wherein the second test executive sequence is a subsequence of the first test executive sequence (i.e., the first test executive sequence calls the second test executive sequence).

In step 805, the first test executive sequence may be executed. In one embodiment, the value of the first local variable may be set during execution of the firs test executive sequence. In another embodiment, the value of the first local variable may be initialized to a default value before execution of the first test executive sequence.

In step 807, the first local variable is propagated to the second test executive sequence, i.e., the second local variable inherits the first value.

The method of FIG. 9 may be implemented in any of various ways. In one embodiment, sequence local variables may have a Boolean option, referred to as "Propagate to Subsequence". The default value of the option may be False. For example, the option may appear as a checkable menu item in a context menu for a local variable. The option may also be accessible as a PropertyObject flag in an API of the test executive software.

If the user enables the Propagate to Subsequence option for a sequence local variable, the variable also exists at run-time as a local variable in subsequences that the sequence calls. The variable may continue to propagate as the call chain extends. Sequence local variables may have a second Boolean option, referred to as "Permit Propagation from Caller". The default value of this option may be False. The Permit Propagation from Caller option may also appear as a checkable menu item in the local variable context menu and may also be accessible as a PropertyObject flag in an API of the test executive software.

The test executive may use the Permit Propagation from Caller option to determine which variable takes precedence when a subsequence defines a variable with the same name as a variable that the calling sequence propagates. If Permit Propagation from Caller is False, the test executive may preserve the subsequence local variable. If Permit Propagation from Caller is True, the test executive may replace the subsequence variable with the variable the caller propagates.

The user may set the Permit Propagation from Caller option to True to specify that a propagated variable will override the sequence variable. The user may set the Permit Propagation from Caller option to False to specify that the propagated variable does not replace the sequence variable. The user may use the False setting to achieve a traditional nested scoping of variables. In one embodiment, the sequence editor may show variables that a sequence inherits at run-time.

When a propagated variable overrides an existing sequence variable, the test executive may generate an error if the data types of the variables do not match.

In one embodiment, the method of FIG. 9 may be employed in hierarchically executing a test executive sequence. For example, consider a system having a sub-component A and a sub-component B, wherein sub-component B is a child sub-component of sub-component A in the system hierarchy, and wherein a test executive sequence A is operable to test sub-component A, and a test executive sequence B is operable to test sub-component B. Thus, test executive sequence A calls test executive sequence B. In one embodiment, the way test executive sequence B "knows" that is that it is called from test executive sequence A is that test executive sequence A passes down relevant information about sub-component A needed to test sub-component B. For example, such context information may be passed by propagating a local variable from test executive sequence A to test executive sequence B, according to the method of FIG. 9.

Exemplary API Call for Requesting Hierarchical Execution of a Test Executive Sequence As described above, the test executive software may provide one or more API functions or methods to programmatically request hierarchical executions of test executive sequences. In one embodiment, a hierarchical execution function or method might have a prototype similar to the following:

Engine.NewHierarchicalExecution(sequenceCallSteps, hierarchicalExecutionFlags, sequenceFileParam, sequenceName, processModelParam, breakAtFirstStep, executionTypeMaskParam [, sequenceArgsParam] [, editArgsParam] [, InteractiveArgsParam])

The NewHierarchicalExecution method accepts inputs that specify the hierarchy path to the test executive sequence to execute. Local variables of sequences in the path may propagate down to the starting sequence as if execution had proceeded from the root sequence to the starting sequence, as described above with reference to the method of FIG. 9.

Also, the NewHierarchicalExecution method allows the developer to specify whether the test executive executes the setup and cleanup step groups for sequences along the hierarchy path to the selected starting sequence.

The following describes implementation details of the NewHierarchicalExecution method.

Return Type: Execution; creates and returns a new Execution object.

The execution creates a call stack specified as a parameter without executing on the call stack the "main" steps of the sequences of the specified path. To specify the call stack to create, an array of sequence call steps is passed as the "sequenceCallSteps" parameter. When the execution reaches the sequence that contains the first sequence call step that the sequenceCallSteps parameter specifies, the execution follows the execution path that the array of sequence call steps defines. Execution resumes normally in the sequence that the last sequence call step in the array calls. The steps in the sequences that contain the sequence call steps do not execute. However, local variables propagate normally according to their propagation options.

| Parameter: | sequenceCallSteps |
|---|---|
| Type: | Safe Array |
| Description: | Pass an array of sequence call steps. The array represents a call stack to recreate while only executing the setup steps from the sequences on the stack. Except for the first step, each step in the array should be a step that resides in the sequence that the previous step in the array calls |
| Parameter: | hierarchicalExecutionFlags |
| Type: | Long |
| Description: | Pass 0 for the default behavior or pass one or more HierarchicalExecMask constants. Use the bitwise-OR operator to pass multiple constants. See HierarchicalExecutionFlags constants below for more information. |
| Parameter: | sequenceFileParam |
| Type: | SequenceFile |

-continued

| | |
|---|---|
| Description: | Pass the sequence file object that contains the sequence to execute. If the execution uses a process model, pass the client sequence file object. |
| Parameter: | sequenceName |
| Type: | String |
| Description: | Pass the name of the sequence or process model entry point to execute |
| Parameter: | processModelParam |
| Type: | SequenceFile |
| Description: | Pass the process model sequence file object if you want to execute a process model entry point. Otherwise, pass a NULL dispatch pointer in MFC, a NULL object reference in LabVIEW, 0 in LabWindows/CVI, or the Nothing keyword in Visual Basic. |
| Parameter: | breakAtFirstStep |
| Type: | Boolean |
| Description: | Pass True to suspend execution before executing the first step. |
| Parameter: | executionTypeMaskParam |
| Type: | Long |
| Description: | Pass 0 for the default beahvior or pass one or more ExecutionTypeMask constants. Use the bitwise OR operator to pass multiple constants. |
| Parameter: | sequenceArgsParam |
| Type: | Variant |
| Description: | Pass a PropertyObject object that contains the arguments to the sequence you want to execute. Each subproperty of the PropertyObject object represents a parameter to the sequence. The subproperties must appear in the same order as the sequence parameters. This parameter is optional. |
| Parameter: | editArgsParam |
| Type: | Variant |
| Description: | Pass an EditArgs object that indicates which items are currently selected in the operator interface. This is required only for process model points. |
| Parameter: | InteractiveArgsParam |
| Type: | Variant |
| Description: | Pass an InteractiveArgs object that indicates which steps are currently selected in the operator interface and contains looping information necessary for an interactive execution. Pass this parameter only for interactive executions. |

HierarchicalExecutionFlags Constants

HierarchicalExecMask_DontRunSetupAndCleanup—(Value: 0x2) Specifies that a hierarchical execution does not run setup or cleanup steps when it generates a call stack. This flag applies to the sequences that contain the sequence call steps you pass to the sequenceCallSteps parameter of NewHierarchicalExecution.

HierarchicalExecMask_IgnorePreconditions—(Value: 0x8): Specifies that when the NewHierarchicalExecution method creates the call stack that its arguments specify, it does not check the preconditions of the sequence call steps that comprise the call stack.

HierarchicalExecMask_RunRemainingSequence—(Value: 0x4) Specifies that execution continues normally when the call stack unwinds. When the sequence call steps return from the call stack that the execution generates, the remaining steps execute normally in the sequences that contain the calls.

Although the embodiments above have been described in considerable detail, numerous variations and modifications will become apparent to those skilled in the art once the above disclosure is fully appreciated. It is intended that the following claims be interpreted to embrace all such variations and modifications.

I claim:

1. A computer-implemented method for testing a sub-component of a system comprising a hierarchy of sub-components organized in multiple levels, the method comprising:

creating a plurality of test executive sequences in response to user input, wherein each test executive sequence maps to a sub-component of the system and is operable to test the respective sub-component, wherein the plurality of test executive sequences are configured to execute according to a hierarchy corresponding to the hierarchy of sub-components, wherein the hierarchy of subcomponents comprises a top level and a first level, wherein the first level is lower in the hierarchy than the top level;

calling a first test executive sequence to test a first sub-component of the first level in the hierarchy, wherein the first level in the hierarchy corresponds to only a subset of the plurality of test executive sequence; and executing the first test executive sequence without executing test executive sequences that map to sub-components above the first sub component in the hierarchy;

wherein said executing the first test executive sequence tests the first sub-component.

2. The method of claim 1, wherein said executing the first test executive sequence comprises, for test executive sequences that map to sub-components above the first sub-component in the hierarchy, executing only setup portions of the test executive sequences that map to sub-components above the first sub-component in the hierarchy.

3. The method of claim 2, wherein the setup portions are operable to set variable values used in the first test executive sequence.

4. The method of claim 1, further comprising:

executing only a portion of one or more test executive sequences that map to sub-components above the first sub-component in the hierarchy, for purposes of setting up data used in the first test executive sequence.

5. The method of claim 4, wherein said executing only a portion of one or more test executive sequences that map to sub-components above the first sub-component in the hierarchy does not include performing functional testing of the sub-components above the first sub-component in the hierarchy.

6. The method of claim 1, further comprising:

executing only a portion of one or more test executive sequences that map to sub-components above the first sub-component in the hierarchy, for purposes of initializing a hardware device.

7. The method of claim 1, wherein each test executive sequence includes a setup group of step and a main group of steps;

wherein said executing the first test executive sequence without executing test executive sequences that map to sub-components above the first sub-component in the hierarchy comprises executing steps in the setup groups of the test executive sequences that map to sub-components above the first sub-component in the hierarchy but does not comprise executing steps in the main groups.

8. The method of claim 1, further comprising:

displaying the plurality of test executive sequences on a graphical use interface in a hierarchical manner corresponding to the sub-components of the system.

9. The method of claim 1, wherein said calling the first test executive sequence is performed in response to user input requesting to call the first test executive sequence.

10. The method of claim 9, further comprising:
  displaying the plurality of test executive sequences on a graphical user interface; and
  receiving user input requesting to call the first test executive sequence from the displayed plurality of test executive sequences.

11. The method of claim 1,
  wherein said calling the first test executive sequence is performed in response to an application programming interface (API) call to execute the first test executive sequence.

12. A computer-implemented method for testing a sub-component of a system comprising a hierarchy of sub-components organize in multiple levels, the method comprising:
  creating a plurality of test executive sequences in response to user input, wherein each test executive sequence maps to a sub-component of the system and is operable to test the respective sub-component, wherein the plurality of test executive sequences are configured to execute according to a hierarchy corresponding to the hierarchy of sub-components, wherein the hierarchy of subcomponents comprises a top level and a first level, wherein the first level is lower in the hierarchy than the top level;
  calling a first test executive sequence to test a first sub-component of the first level in the hierarchy, wherein the first level in the hierarchy corresponds to only a subset of the plurality of test executive sequences;
  executing only a portion of one or more test executive sequences that map to sub-components above the first sub-component in the hierarchy, for purposes of setting up data used in the first test executive sequence, after said calling; and
  executing the first test executive sequence after said executing only a portion of one or more test executive sequences that map to sub-components above the first sub-component in the hierarchy;
  wherein said executing the first test executive sequence tests the first sub-component.

13. The method of claim 12,
  wherein said executing only a portion of one or more test executive sequences that map to sub-components above the first sub-component in the hierarchy comprises executing only setup portions of the test executive sequences that map to sub components above the first sub-component in the hierarchy.

14. The method of claim 13,
  wherein the setup portions are operable to set variable values used in the first test executive sequence.

15. The method of claim 12,
  wherein said executing only a portion of one or more test executive sequences that map to sub-components above the first sub-component in the hierarchy does not include performing functional testing of the sub-components above first sub-component in the hierarchy.

16. The method of claim 12,
  wherein said executing only a portion of one or more test executive sequences that map to sub-components above the first sub-component in the hierarchy comprises executing only the portion of the one or more test executive sequences for purposes of initializing a hardware device.

17. The method of claim 12,
  wherein each test executive sequence includes a setup group of steps and a main group of steps;
  wherein said executing only a portion of one or more test executive sequences that map to sub-components above the first sub-component in the hierarchy comprises executing steps in the setup groups of the test executive sequences that map to sub-components above the first sub-component in the hierarchy but does not comprise executing steps in the main groups of the test executive sequences that map to sub-components above the first sub-component in the hierarchy.

18. A computer-implemented method for testing a sub-component of a system, wherein the system comprises a plurality of sub-components, the method comprising:
  creating a plurality of test executive sequences in response to user input, wherein each test executive sequence maps to a sub-component of the system and is operable to test the respective sub-component, wherein the plurality of test executive sequences are configured to execute according to a hierarchy, wherein the hierarchy of subcomponents comprises a top level and a first level, wherein the first level is lower in the hierarchy than the toil level;
  calling a first test executive sequence at the first level in the hierarchy to test a first sub-component, wherein the first level in the hierarchy correspond to only a subset of the plurality of test executive sequences; and
  executing the first test executive sequence without executing test executive sequences above the first level in the hierarchy,
  wherein said executing the first test executive sequence tests the first sub-component.

19. The method of claim 18, further comprising:
  executing only a portion of one or more test executive sequences above the first level in the hierarchy, for purposes of setting up data used in the first test executive sequence.

20. The method of claim 18,
  wherein said executing the first test executive sequence without executing test executive sequences above the first level in the hierarchy comprises executing only setup portions of the test executive sequences that are above the first level in the hierarchy;
  wherein the setup portions are operable to set variable values used in the first test executive sequence.

21. A computer-implemented method for testing a sub-component of a system, wherein the system comprises a plurality of sub-components, the method comprising:
  creating a plurality of test executive sequences in response to user input, wherein each test executive sequence maps to a sub-component of the system and is operable to test the respective sub-component, wherein the plurality of test executive sequences are configured to execute according to a hierarchy, wherein the hierarchy of subcomponents comprises a top level and a first level, wherein the first level is lower in the hierarchy than the top level;
  calling a first test executive sequence at a first level in the hierarchy to test a first sub-component, wherein the first level in the hierarchy corresponds to only subset of the plurality of test executive sequences;
  executing only a portion of one or more test executive sequences above the first level in the hierarchy after said calling; and executing the first test executive sequence after said executing only a portion of one or more test executive sequences above the first level in the hierarchy;
wherein said executing the first test executive sequence tests the first sub-component.

22. The method of claim 21,
wherein said executing only a portion of one or more test executive sequences above the first level in the hierarchy is performed for purposes of setting up data used in the first test executive sequence.

23. The method of claim 21,
wherein said executing only a portion of one or more test executive sequences above the first level in the hierarchy is performed for purposes of initializing hardware device.

24. The method of claim 21,
wherein said executing only a portion of one or more test executive sequences above the first level in the hierarchy comprises executing only setup portions of the test executive sequences that are above the first level in the hierarchy;
wherein the setup portions are operable to set variable values used in the first test executive sequence.

25. The method of claim 21,
wherein said executing only a portion of one or more test executive sequences above the first level in the hierarchy does not include performing functional testing of the sub-components above the first level in the hierarchy.

26. The method of claim 21,
wherein each test executive sequence includes a setup group of steps and a main group of steps;
wherein said executing only a portion of one or more test executive sequences above the first level in the hierarchy comprises executing steps in the setup groups of the test executive sequences above the first level in the hierarchy but does not comprise executing steps in the main groups above the first level in the hierarchy.

27. The method of claim 21, further comprising:
displaying the plurality of test executive sequences on a graphical user interface in a hierarchical manner corresponding to the sub-components of the system.

28. The method of claim 21,
wherein said calling the first test executive sequence is performed in response to user input requesting to call the first test executive sequence.

29. The method of claim 28, further comprising:
displaying the plurality of test executive sequences on a graphical user interface; and
receiving user input requesting to call the first test executive sequence from the displayed plurality of test executive sequences.

30. The method of claim 21,
wherein said calling the first test executive sequence is performed in response to an application programming interface (API) call to execute the first test executive sequence.

31. A computer-implemented method for executing a test executive sequence, the method comprising:
creating a plurality of test executive sequences in response to user input, wherein each test executive sequence comprises a plurality of test executive steps, wherein the plurality of test executive sequences are configured to execute according to hierarchy, wherein the hierarchy comprises a top level and a first level, wherein the first level is lower in the hierarchy than the top level;
hierarchically calling a first test executive sequence from the plurality of test executive sequences; and
hierarchically executing the first test executive sequence in response to said hierarchically calling the first test executive sequence.

32. The method of claim 31,
wherein said hierarchically calling the first test executive sequence comprises specifying a hierarchical path to the first test executive sequence, wherein the hierarchical path specifies a hierarchical path of one or more test executive sequences from the plurality of test executive sequences;
wherein said hierarchically executing the first test executive sequence comprises executing the first test executive sequence from the context of the hierarchical path of test executive sequences.

33. The method of claim 32,
wherein said executing the first test executive sequence from the context of the hierarchical path of test executive sequences comprises partially executing the test executive sequences in the hierarchical path to set up variable values used by the first test executive sequence, but does not comprise executing code modules reference by the test executive sequences in the hierarchical path.

34. The method of claim 32,
wherein one or more of the test executive sequences in the hierarchical path of test executive sequences includes:
a group of setup steps; and
a group of functional steps;
wherein said executing the first test executive sequence from the context of the hierarchical path of test executive sequences comprises executing the setup steps for the test executive sequences in the hierarchical path but does not comprise executing the functional steps for the test executive sequences in the hierarchical path.

35. The method of claim 32,
wherein the hierarchical path of test executive sequences includes a second test executive sequence operable to set a first variable to a first value, wherein the first test executive sequence utilizes the first variable;
wherein said executing the first test executive sequence from the context of the hierarchical path of test executive sequences comprises executing the first test executive sequence with the first variable set to the first value.

36. The method of claim 35,
wherein said executing the first test executive sequence from the context of the hierarchical path of test executive sequences does not comprise complete execution of the second test executive sequence.

37. The method of claim 32,
wherein the first test executive sequence utilizes a first variable;
wherein the hierarchical path of test executive sequences includes a second test executive sequence operable to:
set the first variable to a first value;
invoke one or more code modules;
wherein said executing the first test executive sequence from the context of the hierarchical path of test executive sequences comprises partially executing the second test executive sequence;
wherein said partially executing the second test executive sequence comprises setting the first variable the first value but does not comprise invoking the one or more code modules.

38. A computer-implemented method for testing a unit under test, the method comprising:
creating a test hierarchy including a plurality of test executive sequences for testing the unit under test, wherein the plurality of rest executive sequences are configured to execute according to a hierarchy, wherein the test hierarchy includes a first test executive sequence operable to call a second test executive sequence, and executing the second test executive sequence without executing the first test executive sequence, wherein said executing the second test executive sequence comprises utilizing data from the first test executive sequence;

wherein the second test executive sequence is operable to test at least portion of the unit under test.

39. The method of claim 38, further comprising:

programmatically calling the second test executive sequence;

wherein said executing the second test executive sequence is performed in response to said programmatically calling the second test executive sequence.

40. The method of claim 39, wherein said programmatically calling the second test executive sequence comprises specifying a hierarchical path to the second test executive sequence, wherein the hierarchical path includes the first test executive sequence.

41. A computer-implemented method for calling a test executive sequence, the method comprising:

creating a chain of test executive sequences in response to user input, wherein the chain of test executive sequences includes one top-level test executive sequence and one or more non-top-level test executive sequences; and executing a first non-top-level test executive sequence directly without executing the top-level test executive sequence, wherein the first non-top-level test executive sequence in the hierarchy comprises a subset of the chain of test executive sequences;

wherein the first non-top-level test executive sequence is executable to test a portion of the system.

42. The method of claim 41, further comprising:

executing at least a portion of one or more test executive sequence(s) above the first non-top-level test executive sequence in the chain, for setting up data used by the first non-top-level test executive sequence.

43. A method for testing a portion of a hierarchical system, the method comprising:

displaying a hierarchical view of a test executive sequence hierarchy, wherein the test executive sequence hierarchy corresponds to only a top level and a first level, wherein the first level is lower in the hierarchy than the top level;

receiving user input specifying the first displayed test executive sequence, wherein the first level comprises the first displayed test executive sequence; and executing the first test executive sequence in response to the user input;

wherein said executing the first test executive sequence does not include executing test executive sequences above the first test executive sequence in the hierarchy; and wherein said executing the first test executive sequence comprises testing the portion of the hierarchical system.

44. A method for enabling propagation of a first local variable of a first test executive sequence, the method comprising;

receiving user input indicating a desire to propagate the first local variable to a subsequence of the first test executive sequence;

executing the first test executive sequence, wherein said executing the first test executive sequence comprises propagating the first local variable to the subsequence.

45. The method of claim 44, wherein the subsequence has a second local variable named identically to the first local variable;

wherein the first local variable has a first value;

wherein the second local variable has a second value;

wherein said propagating the first local variable to the subsequence comprises overriding the second value with the first value.

* * * * *

UNITED STATES PATENT AND TRADEMARK OFFICE
CERTIFICATE OF CORRECTION

PATENT NO. : 6,868,508 B2
DATED : March 15, 2005
INVENTOR(S) : James Grey

It is certified that error appears in the above-identified patent and that said Letters Patent is hereby corrected as shown below:

Column 16,
Line 12, please delete "sequence" and substitute -- sequences --;
Line 16, please delete "sub component" and substitute -- sub-component --;
Line 50, please delete "step" and substitute -- steps --;
Lien 61, please delete "use" and substitute -- user --.

Column 17,
Line 14, please delete "organize" and substitute -- organized --;
Line 48, please delete "sub components" and substitute -- sub-components --.

Column 18,
Line 24, please delete "toil" and substitute -- top --;
Line 27, please delete "correspond" and substitute -- corresponds --;
Line 62, please delete "only subset" and substitute -- only a subset --.

Column 19,
Line 13, please delete "initializing hardware" and substitute -- initializing a hardware --.

Column 20,
Line 21, please delete "reference" and substitute -- referenced --.

Column 21,
Line 1, please delete "rest" and substitute -- test --;
Line 11, please delete "least portion" and substitute -- least a portion --.

Signed and Sealed this

Thirty-first Day of May, 2005

JON W. DUDAS
*Director of the United States Patent and Trademark Office*